United States Patent [19]

Brady

[11] 3,936,416

[45] Feb. 3, 1976

[54] NONBURNING, NONDRIPPING, CHAR-FORMING, POLYPROPYLENE COMPOSITION

[75] Inventor: Donnie G. Brady, Bartlesville, Okla.

[73] Assignee: Phillips Petroleum Company, Bartlesville, Okla.

[22] Filed: July 24, 1973

[21] Appl. No.: 382,169

[52] U.S. Cl. ... 260/42.18; 260/42.46; 260/45.9 NP; 260/45.95 S
[51] Int. Cl.$^2$ ............................................. C08F 6/00
[58] Field of Search ... 260/45.9 NP, 45.95 S, 42.18, 260/42.46

[56] References Cited
UNITED STATES PATENTS

| | | | |
|---|---|---|---|
| 3,337,495 | 8/1967 | Corbett et al. | 260/45.95 S |
| 3,395,746 | 8/1968 | Szabo et al. | 264/53 |
| 3,446,765 | 5/1969 | Pryer | 260/23 |
| 3,546,161 | 12/1970 | Wolheim | 260/45.95 |
| 3,562,197 | 2/1971 | Sears et al. | 260/45.9 |
| 3,639,299 | 2/1972 | MacDowell | 260/45.9 |
| 3,649,591 | 3/1972 | Murray et al. | 260/45.9 NP |
| 3,810,862 | 5/1974 | Mathis | 260/45.8 |

OTHER PUBLICATIONS

American Chemical Society — Div. Organic Coatings & Plastic Chemistry, Preprints, Vol. 28, No. 1, 1968, pp. 237 to 242.

Chemistry & Uses of Fire Retardants — by Lyons, John Wiley & Sons, Inc., N.Y.C., 1970, pp. 256 to 258 & 290.

*Primary Examiner*—V. P. Hoke

[57] ABSTRACT

A nonburning, nondripping, char-forming composition of polypropylene by incorporating at least one of the following systems:

1. ammonium polyphosphate (preferably coated with stearylamine) and dipentaerythritol
2. melamine pyrophosphate and dipentaerythritol
3. reaction product of phosphoric acid, urea, dipentaerythritol, and melamine
4. reaction product of phosphoric acid, phosphorus pentoxide, at least one of pentaerythritol, dipentaerythritol, and tripentaerythritol; and melamine.

Preferably all additive systems are degassed at elevated temperature to permit polypropylene compositions containing said additives to be molded without formation of voids.

The thermal degassing of the phosphorus-containing flame retardant additive system prior to their incorporation with polypropylene considerably diminishes void formation or foaming during molding operation.

10 Claims, No Drawings

NONBURNING, NONDRIPPING, CHAR-FORMING, POLYPROPYLENE COMPOSITION

This invention relates to a flame retardant or nonburning, nondripping, char-forming polypropylene composition. It also relates to a method of preparing such compositions. In one of its aspects it relates to modifying ammonium polyphosphate used in the preparation of such a composition. In one of its aspects the invention relates to the modification of additive systems prior to compounding the same with polypropylene to avoid void formation or foaming during molding operations.

In one of its concepts the invention provides a flame retardant or nonburning, nondripping, char-forming polypropylene composition containing polypropylene and a minor amount of at least one of the following additive systems:

1 - ammonium polyphosphate (preferably coated with stearylamine) and dipentaerythritol
2 - melamine pyrophosphate and dipentaerythritol
3 - reaction product of phosphoric acid, urea, dipentaerythritol, and melamine
4 - reaction product of phosphoric acid, phosphorus pentoxide, at least one of pentaerythritol, dipentaerythritol, and tripentaerythritol; and melamine.

In another of its concepts the invention provides an improved ammonium polyphosphate for such additive system in which the ammonium polyphosphate, as indicated herein, is a priori coated with a minor proportion of stearylamine before compounding in the polypropylene thus avoiding disadvantages as herein set forth.

In a further concept, the invention provides a polypropylene composition containing an additive rendering it fire retardant or nonburning, nondripping and char-forming which will be substantially non-void forming during molding operations due to gas formation.

In another concept, the pH of a water slurry of the additive is adjusted prior to degassing.

I have now discovered certain specific additive system compositions which can be incorporated with polypropylene, as herein described in more detail, to render the same fire retardant or nonburning, nondripping, and char-forming. Such compositions are finding increasing usefulness as the use of polypropylene is expanded. While the additive systems are operative as compounded with polypropylene to produce compositions which can be usefully applied, according to a preferred concept of the invention, that is the degassing, the preferred compositions of the polypropylene and the additive system are produced when the additive system has been thermally degassed.

Thus, I have discovered that an increase in molding temperatures can be accomplished without undesirable void formation if the additive system composites are degassed prior to formulation with the polypropylene.

It is an object of this invention to provide a fire retardant or nonburning, nondripping, char-forming polypropylene composition. It is another object of this invention to provide the various specific additive systems for incorporation with polypropylene to render the same fire retardant or nonburning, nondripping and char-forming. It is a further object of this invention to so treat additive systems prior to their incorporation with polypropylene to render the same fire retardant or nonburning, nondripping and char-forming that when the polypropylene is thus composited therewith and used in a molding operation in which void formation is undesirable, void formation will have been substantially completely eliminated or at least very substantially reduced. In a still further object of the invention there is produced a polypropylene composition as herein described which can be molded at temperatures substantially higher than heretofore, the composition containing a specially modified fire retarding, char-forming additive system.

Another object is to provide a composition of better color, thermal stability and relatively low void formation.

Other aspects, concepts, objects and several advantages of the invention are apparent from a study of this disclosure and the appended claims.

According to the present invention, there is provided a nonburning, nondripping, char-forming composition of polypropylene and at least one of the additive systems selected from:

1 - ammonium polyphosphate (preferably coated with stearylamine) and dipentaerythritol
2 - melamine pyrophosphate and dipentaerythritol
3 - reaction product of phosphoric acid, urea, dipentaerythritol, and melamine
4 - reaction product of phosphoric acid, phosphorus pentoxide, at least one of pentaerythritol, dipentaerythritol, and tripentaerythritol; and melamine.

Still further according to the invention, the ammonium polyphosphate is coated or covered with a minor proportion, say 1–3 weight percent stearylamine based on the weight of the ammonium polyphosphate prior to compounding in the additive system or in the polypropylene to alleviate an incompatibility which results in "blooming" in the molded polypropylene with additional disadvantages being a normally undesired tacky surface and a normally undesired dull appearance.

Still further according to the invention, the additive systems as herein described are degassed also as herein described.

There are several embodiments described in this specification. Other embodiments will be evident to one skilled in this art having studied this disclosure.

Generally, a thermal degassing can be an intregal part of a synthetic procedure or it can be practiced on a blend of compounds.

Usually the degassing is practiced by heating to an elevated temperature at which the reaction causing foaming ensues. The heating is continued substantially until foaming or gas formation has subsided.

Also according to the invention, the pH of a water slurry of the additive system is adjusted to about 6 prior to degassing.

The additive system thus prepared can be added without cooling directly to polypropylene and composited therewith or if desired can be cooled first. Or the additive system upon cooling at least to an extent can be later composited or compounded with the polypropylene in suitable proportions which for each condition of service can be determined by mere routine testing by one skilled in the art having possession of this disclosure and having studied same.

In Table I there are given several embodiments, namely Embodiments I, II, III and IV. There are two subembodiments under the heading of Embodiment I.

The thermal degassing of the phosphorus-containing additive can be carried out on a blend of compounds as described in Embodiment II or the thermal degassing can be a step in a synthetic procedure as practiced in Embodiments III and IV. The phosphorus-containing flame retardant additives which are thermally degassed according to the present invention generally correspond to one or more of the compositions described in Embodiments II, III and IV of Table I.

Embodiment I primarily shows the flame retardant effectiveness of a phosphorus-containing additive system which has not been degassed, according to the invention. Foaming, i.e, void formation, is such a severe problem in the practice of Embodiment I in which the additive system has not been a priori degassed, that molding must be carried out at an impractically low temperature of about 350°–400°F if the problem is to be minimized. This can cause other problems.

The increase in suitable molding temperatures in Embodiment II over Embodiment I, illustrates that Embodiment II yields nonburning, nondripping polypropylene formulations which possess significantly less tendency to foam. Therefore, these formulations can be molded at correspondingly higher temperatures. Foaming during the molding operation is usually undesirable because voids which are produced in the final molded objects are generally undesirable. The higher molding temperatures of Embodiment III and IV illustrate that these systems yield polypropylene samples with less tendency to foam during molding. In general, molding temperatures of approximately 450°–500°F are considered desirable or necessary.

Table I

Phosphorus Containing Flame Retardant Additives
Suitable Molding Temperatures (SMT)

|  | Embodiment I[a] | Embodiment II[b] | Embodiment III[c] | Embodiment IV[d,e] |
|---|---|---|---|---|
| (i) | ammonium polyphosphate (AP) dipentaerythritol (DPE) | Same additives as Embodiment I; thermal degassing of additives prior to formulation in polypropylene distinguishes Embodiment II over Embodiment I | Reaction product of $H_3PO_4$, urea, dipentaerythritol, and melamine | Reaction product of $H_3PO_4$, $P_2O_5$, dipentaerythritol, and melamine |
| (ii) | melamine pyrophosphate (MP) and dipentaerythritol (DPE) | | | |
|  | SMT 350–400°F | SMT 350–450°F | SMT 350–475°F | SMT 350–475°F |

[a]In Embodiment (I), according to the invention, it is advantageous to coat the ammonium polyphosphate with about 1–3 weight percent stearylamine prior to compounding in polypropylene: this procedure alleviates an incompatibility problem in the polypropylene. The use of uncoated ammonium polyphosphate results in "blooming" in the molded polypropylene which exhibits a tacky surface with a dull appearance. No incompatibility problem was encountered in Embodiments I(ii), II, III and IV. See footnote 3, Table II.
[b]The additives are heated at 175 to 275°C for 0.5 to 4 hours to cause a foaming reaction. After the thermal degassing, the residue is used to formulate a nonburning, nondripping polypropylene.
[c]The reaction product is heated at 190–260°C for 0.5 to 4 hours before formulating in polypropylene (integral part of additive synthesis procedure).
[d]The reaction product is heated to 190–280°C for 0.5 to 6 hours before formulating in polypropylene (integral part of additive synthesis procedure).
[e]Pentaerythritol or tripentaerythritol can be used in place of dipentaerythritol in Embodiment IV.

A. Embodiment I

The additives shown in Table I under Embodiment I (i) and I (ii) were blended in polypropylene on a three-inch roll mill for 5 minutes at 320°–350°F. Samples for testing were cut from sheets of the formulation that has been molded at 350°F in picture frame molds. Results are summarized in Table II.

Table II

Evaluation Data on Flame Retardant
Polypropylene Samples (Embodiment I of Table I)[e]

| Run No. | Additive(php)[a] | Burning Test Results ASTM D635[b] | ASTM D2863[c] | UL 94[d] | Ratio AP/DPE |
|---|---|---|---|---|---|
| Control | None | B | Ca. 18 | | |
| 1. | AP (30) DPE (6) | SE | N.D. | Not SE-O | 5:1 |
| 2. | AP (40) DPE (8) | SE | N.D. | Not SE-O | 5:1 |
| 3. | AP (40) DPE (12) | SE-NB | 28.7 | SE-O | 3.33:1 |
| 4. | AP (40) DPE (16) | NB | 29.5 | SE-O | 2.5:1 |
| 5. | AP (30) DPE (16) | NB | N.D. | SE-O | 1.87:1 |
| 6. | AP (20) DPE (20) | NB | N.D. | SE-O | 1:1 |
| 7. | AP (40) DPE (16) Asbestos (10) | SE | N.D. | SE-O | 2.5:1 |
| 8. | AP (40) DPE (16) Glass Fiber (10) | NB-SE | N.D. | SE-O | 2.5:1 |
| 9. | MP (30) DPE (16) | NB-SE | 31 | SE-O | 1.87:1 |

The results of runs 1–9 demonstrate the flame retardant effectiveness of

Table II-continued
Evaluation Data on Flame Retardant Polypropylene Samples (Embodiment I of Table I)[e]

| Run No. | Additive(php)[a] | Burning Test Results ASTM D635[b] | ASTM D2863[c] | UL 94[d] | Ratio AP/DPE |
|---|---|---|---|---|---|

Embodiment I. (Note SE-O ratings on UL 94 test for runs 3–9.)
[a]AP, MP, and DPE represent respectively, ammonium polyphosphate, melamine pyrophosphate and dipentaerythritol.
[b]B, SE, and NB represent, respectively, burning, self-extinguishing and nonburning.
[c]N.D. represents not determined. The numbers represent "oxygen index" as defined in ASTM D2863. These numbers are defined as "limiting oxygen index" in Fenimore and Martin, Mod. Plastics, Nov. 1966, page 141.

[d]UL-94 refers to an Underwriters Laboratory test method described in Mod. Plastics, Oct. 1970, page 96. In accordance with this test, the SE-O rating indicates that a vertically positioned molded specimen contacted for 10 seconds with a flame extinguishes within 5 seconds after removal of the flame on two successive flame applications and doesn't drip flaming particles capable of igniting a cotton ball positioned 12 inches below the molded specimen. Molded specimen sample slabs were 5" × ½" × ⅛".
[e]Formulations containing ammonium polyphosphate coated with 1 to 3 weight per cent stearylamine exhibited no incompatibility in molded polypropylene (see footnote b in Table I). The stearylamine in chloroform was contacted with ammonium polyphosphate. Removal of chloroform solvent on a rotary evaporator gave the coated ammonium polyphosphate suitable for use in the present invention.

The amount and nature of the additives generally suitable for use in Embodiment I and II are in the following approximate ranges.

| Additive | Broad(php) | Preferred(php) |
|---|---|---|
| Ammonium Polyphosphate (AP) or Melamine Pyrophosphate (MP) | 10–70 | 20–40 |
| Dipentaerythritol (DPE) | 5–30 | 10–20 |
| Fillers such as glass fiber, TiO$_2$ or asbestos | 0–15 | 1–10 |
| Wt. Ratio AP/DPE or Wt. Ratio MP/DPE | | 6:1 to 1:1 |
| Total Loading of Components | 30–90 | 40–60 |
| Wt. % Stearylamine based on ammonium polyphosphate for coating | 0.5 to 5 | 1 to 3 |

Range for the formulations given herein in each embodiment can be determined by routine experimentation and those given are now preferred. (B) Embodiment II The operability of Embodiment II in the present invention is substantiated by the thermal degassing of a melamine pyrophosphate/dipentaerythritol blend. The thermal degassing can be carried out at about 175°–275°C until a foaming reaction has subsided. The resulting residue can be formulated with polypropylene and molded at 350°–450°F without foaming. The molded samples are nonburning and nondripping. The procedure of Example I is a representative thermal degassing treatment.

EXAMPLE I

An 8g sample of melamine pyrophosphate was mixed with 4g dipentaerythritol and the mixture was pulverized. The resulting powder was placed in a 200 ml round bottomed flask equipped with stirrer and nitrogen inlet tube. The mixture of reactants was degassed by heating the flask in an oil bath up to a temperature of 260°C over a 1.75 hours time interval. The resulting light tan solid was ground to a powder and used as a flame retardant in polypropylene (See Runs 10 and 11 in Table III. In Run 12 a different ratio of MP/DPE was used.).

Table III
Evaluation Data on Flame Retardant Polypropylene Samples Based on Degassed MP/DPE Additive (Embodiment II)

| Run No. | Level of Additive(php) | (MP/DPE)Wt. Ratio[a] | ASTM D635-63 | Observations on Molded Polypropylene Samples |
|---|---|---|---|---|
| 10 | 45 | 2:1 | NB-SE | Good char; nondripping; foams a little at 475°F in 5 minutes |
| 11 | 45 | 2:1 | SE | No foam at 425°F; nondripping |
| 12 | 45 | 1.67:1 | NB | Stable at 475°F for 5 minutes (no foam); nondripping |

[a]Prior to thermal degassing treatment of MP/DPE blend.

The results in Table III indicate that in Embodiment II suitable molding temperatures (SMT) in the range of 450°F (350°–450°F) which are desirable can be used. The thermal degassing procedure of Embodiment II thus significantly reduces the tendency of formulated polypropylene to foam during molding. The samples of Embodiment I were molded at approximately 350°F to avoid the foaming problem. Higher temperatures would not have been possible within undue foaming.

The tendency of formulations to foam was studied by examining molded samples which had been maintained at elevated temperature for a specified time. Such samples were broken and visually examined in cross-section for the presence of voids due to foaming.

As noted above, the operating ranges for Embodiment I are also applicable to Embodiment II.

Thermal degassing of he ammonium polyphosphate/dipentaerythritol system can be practiced by heating as herein described.

C. Embodiment III

The operability of Embodiment III in the present invention is demonstrated by the thermal degassing of the reaction product derived from $H_3PO_4$, urea, dipentaerythritol, and melamine. Preferably, in practice, the product from the reaction of $H_3PO_4$, urea, dipentaerythritol is isolated as a white solid which is subsequently heated at an elevated temperature with melamine to complete the preparation and degassing of the flame retardant additive as described in Example II and the evaluation data on molded flame retardant polypropylene samples are given in Table IV. Alternatively, $H_3PO_4$, urea, dipentaerythritol, and melamine can be reacted simultaneously.

A 10g sample of Example II product was pulverized with 4.92g melamine and heated at 220°C (wt. loss 3.4g, 22%)

d. (Wt. ratio of Example II product to melamine = 2.04)

A 20g sample of Example II product was pulverized with
9.8g melamine and heated at 220°C (wt. loss 6.9g, 23%) The above additives (a) – (d) were used as flame retardants in polypropylene and the evaluation data are given in Table IV. See Runs 13–16.

Table IV

Evaluation Data on Nonburning Nondripping
Polypropylene Samples Based on Degassed Product
from the Reaction of Phosphoric Acid, Urea,
Dipentaerythritol, and Melamine (Embodiment III)

| Run No. | Additive Level (php) | ASTM D2863-70 Oxygen Index | ASTM D635-63 | UL-94[b] Test | Observations on Molded Polypropylene Samples |
|---|---|---|---|---|---|
| 13 | 45 | 29.8[a] | NB | 4 | Nonburning and Nondripping with Excellent Char |
| 14 | 45 | 27.7 | NB | 5 | " |
| 15 | 45 | 28.7 | NB | 7 | " |
| 16 | 45 | Not Determined | NB | 7 | Nonburning and Nondripping with Excellent Char Does not foam at 475°F in 5 minutes |

[a]The limiting oxygen index of polypropylene containing no flame retardant is about 18.5.
[b]Sample slabs were 5" × ½" × ⅛". The numbers 4, 5, and 7 indicate the number of ignitions which were self-extinguished within 5 seconds after removing the flame from the test sample. The materials of Table IV are classified as SE-O (see footnote d of Table I).

Generally, the molar ratio of $H_3PO_4$:urea:dipentaerythritol will be in the approximate range 7–8:14–16:0-.5–1.5.

EXAMPLE II

A 90g (1.5 moles) sample of urea was placed in a 500 ml threenecked flask equipped with a stirrer, reflux condenser and addition funnel. After the slow addition of 86.5g of 85% phosphoric acid (0.75 mole $H_3PO_4$), the mixture was warmed to give a solution. Water (20 ml) was added to this solution followed by the addition of 28g (0.11 mole) of dipentaerythritol. The stirred reaction mixture was heated for 20 hours at approximately 90°C and then the temperature was gradually increased to about 130°C and maintained at 130°C for 2 hours. The reaction mixture foamed as the temperature was increased to 130°C. The reaction mixture was cooled to room temperature and filtered to remove a white solid which was washed with 50 ml cold water and air-dried to give 72.6g of product (m.p. 186°C dec.). This product was divided into portions each of which was treated with melamine and degassed in an oven for a period of approximately 2 hrs. as follows:

a. (Wt. ratio of Example II product to melamine = 6:1)

A 10g sample of Example II was pulverized with 1.64g melamine and heated at 220°C (wt. loss 3.25g 28%)

b. (Wt. ratio of Example II product to melamine = 3.05)

A 10g sample of Example II product was pulverized with 3.28g melamine and heated at 220°C (wt. loss 3.34g, 25%)

c. (Wt. ratio of Example II product to melamine = 2.03)

The data of Table IV (see especially Run 16) demonstrate that the nonburning nondripping polypropylene made in accordance with Embodiment III can be molded without foaming over the temperature range of 350°–475°F.

In the practice of Embodiment III, $H_3PO_4$, urea, dipentaerythritol, are reacted in an approximate molar ratio of 7.5:15:1 to give a white solid (m.p. 186°C dec.). On heating this white solid (Q) with melamine at 220°C the inventive flame retardant of Embodiment III is produced. Temperatures in the range of 190° to 280°C are suitable for this heat treatment. Weight ratios of (Q) to melamine can vary over the range of 10:1 to 1:2 with a preferred range of 6:1 to 2:1.

D. Embodiment IV

The operability of Embodiment IV in the present invention is demonstrated by the thermal degassing of the reaction product derived from $H_3PO_4$, $P_2O_5$, dipentaerythritol, and melamine. Examples III and IV describe the preparation and thermal degassing of the additive. Evaluation data on molded flame retardant polypropylene samples are given in Table V. Pentaerythritol replaces dipentaerythritol in Example V.

The following Example III, employs in its preparative method a procedure somewhat different from others which have been set forth. Thus, $P_2O_5$ and $H_3PO_4$ are brought together and dipentaerythritol then added to the admixture which is heated for a time following which melamine is added with additional heating and further melamine and further heating.

Generally, molar ratios in this embodiment will be in the following approximate ranges: $H_3PO_4$:$P_2O_5$:pentaerythritol 0.5–1.5:2–3:1–2; $H_3PO_4$:$P_2O_5$:dipentaerythritol 0.5–1.5:2–3:0.5–1.5; and $H_3PO_4$:$P_2O_5$:tripentaerythritol 0.5–1.5:2–3:1.5–2.5.

EXAMPLE III

A 34g (0.24 mole) sample of phosphorus pentoxide was placed in a 200 ml three-necked round bottomed flask fitted with a stirrer, addition funnel and reflux condenser. The dropwise addition of 0.1 mole (11.6g of 85% $H_3PO_4$) phosphoric acid to the phosphorus pentoxide was followed by the addition of 25.4g (0.1 mole) of dipentaerythritol. The mixture was stirred for 30 minutes at room temperature and then heated to a mobile mass by means of a hot oil bath. Heating was continued at 110°C for four hours and the reaction mixture became light brown. A total of 20g (0.16 mole) melamine was added in 5g (0.04 mole) portions and the reaction mixture became very thick. The mixture was cooled to room temperature and stored overnight. The reaction mass was heated to 120°C and an additional 27g (0.216 mole) of melamine was added as the temperature was slowly increased to 160°C. Heating at 160°C was continued for one hour after all the melamine had been added. The semisolid reaction product was removed from the flask and allowed to solidify before grinding to a powder (109g).

A 10g sample of the above product was heated for one hour in an oven at 230°–235°C. During this heat treatment, the sample lost 0.5g in weight and darkened in color. A 9.0g sample of this material was blended with 20g of polypropylene and molded into bars for flammability tests reported in Table V (See Run 17).

EXAMPLE IV

This procedure was the same as used in Example III except for the addition of 5g (0.04 mole) melamine before heating the mixture to about 110°C. This mixture was heated in an oil bath at 110°–120°C for 5 hours and then 15g (0.12 mole) melamine was added slowly in 5g portions. After standing overnight at room temperature, the mixture was heated to 130°C and the remaining 17.2g (37.2g total, 0.27 mole) melamine was added in small portions as the temperature was slowly increased to 165°C over a 3 hour period. The resulting cream colored mass was heated at 165°C for an additional 1.5 hours after all the melamine had been added. On cooling to room temperature the reaction mixture solidified and was ground to a fine powder which weighed 105.8g.

A 10g sample of the above product was heated for one hour in an oven at 230°–240°C. During this heat treatment, the sample lost 0.5g in weight. A 9.0g sample of this material was blended with 20g of polypropylene and molded into bars for flammability tests reported in Table V (See Run 18).

In the practice of Embodiment IV, $H_3PO_4$, $P_2O_5$, and dipentaerythritol are reacted in an approximate molar ratio of 1:2:5:1. The preparation of the inventive flame retardant is completed by the addition of melamine and additional heating as described in Examples III and IV. The additive is subjected to a final heat treatment in the suitable temperature range of 160°–280°C with a preferred temperature range of 220°–250°C.

In the practice of Embodiment IV, pentaerythritol can be substituted for dipentaerythritol as demonstrated in Example V. It is to be noted in Example V that $H_3PO_4$, $P_2O_5$ and pentaerythritol are reacted in an approximate molar ratio of 1:2.5:1.5.

EXAMPLE V

A 47g (0.33 mole) sample of phosphorus pentoxide was placed in a 400 ml beaker equipped with a stirrer and nitrogen inlet tube to maintain an inert atmosphere during the preparative procedure. The dropwise addition of 0.133 mole (15.3g of 85% $H_3PO_4$) phosphoric acid required 15 minutes and was followed by the addition of 27.2g (0.2 mole) of pentaerythritol. The reaction mixture was stirred and heated to about 120°C before the addition of 5g (0.04 mole)melamine. Heating was continued with stirring for approximately 5 hours and the temperature varied between 120° and 124°C. An additional 15g (0.12 mole) melamine was blended into the hot mixture before heating was stopped. At this point the reaction mixture possessed an off-white color.

The reaction mass was heated to 175°C and additional 30g (0.24 mole) melamine was added and the temperature was increased to 230°C for a period of two hours. The solid was removed from the beaker and pulverized to give 136g of off-white powder.

A 25g sample of the above product was heated for 2 hours in an oven at 240° to 250°C. During this heat treatment, the sample lost 2.3g in weight and turned from an off-white color to a light tan color being darker on top. This material was ground to a tan powder before being formulated in polypropylene. Results of the falmmability tests are given in Table VI.

Table VI[a]

Evaluation Data on Nonburning Nondripping Polypropylene Sample Based on Degassed Product from the Reaction of Pentaerythritol, $H_3PO_4$, $P_2O_5$ and Melamine (Embodiment IV)

| ASTM[b] D635-63 | ASTM[c] D2863-70 Oxygen Index | Observations on Molded Polypropylene Sample |
|---|---|---|
| NB | 30.3 | Nondripping; excellent char; foams just a very little at |

Table V

Evaluation Data on Nonburning Nondripping Polypropylene Samples Based on Degassed Product from the Reaction of Dipentaerythritol, Phosphoric Acid, $P_2O_5$ and Melamine (Embodiment IV)

| Run No. | Additive Level (php) | ASTM D2863-70[a] Oxygen Index | ASTM D635-63 | Observations on Molded Polypropylene Samples |
|---|---|---|---|---|
| 17 | 45 | 27.8 | NB | Nonburning, Nondripping Excellent char, no foaming at 470°F/10 min. Does foam at 480°F/10 min. |
| 18 | 45 | 28.7 | NB | Nonburning, Nondripping Excellent char |

[a]It is to be noted that oxygen index is the minimum concentration of oxygen expressed as volume per cent in a mixture of oxygen and nitrogen that will just support combustion of a material under the conditions of ASTM method D2863-70. The oxygen index of polypropylene containing no flame retardant is about 18.5.

Table VI[a]-continued

Evaluation Data on Nonburning Nondripping Polypropylene Sample Based on Degassed Product from the Reaction of Pentaerythritol, $H_3PO_4$, $P_2O_5$ and Melamine (Embodiment IV)

| ASTM[b] D635-63 | ASTM[c] D2863-70 Oxygen Index | Observations on Molded Polypropylene Sample |
|---|---|---|
| | | 480°F/10 min. |

[a]Additive level was 45 php (i.e., 45 parts of additive per 100 parts of polymer).
[b]NB represents nonburning.
[c]See footnote a of Table V.

It is to be noted in Example V of Embodiment IV that $H_3PO_4$, $P_2O_5$, and pentaerythritol are reacted in an approximate molar ratio of 1:2.5:1.5. In the practice of Embodiment IV, see Example IV, $H_3PO_4$, $P_2O_5$ and dipentaerythritol were reacted in an approximate molar ratio of 1:2.5:1.

The procedure described in Example VI below is representative of Embodiment IV for the preparation of phosphate additives which can be base treated before being thermally degassed for use in the present invention.

EXAMPLE VI

A 34g (0.24 mole) sample of phosphorus pentoxide was placed in a 200 ml three-necked flask equipped with a stirrer, addition funnel and reflux condenser fitted with a nitrogen inlet tube. After the dropwise addition of 11.8g of 85% phosphoric acid (0.1 mole $H_3PO_4$), 25.4g (0.1 mole) dipentaerythritol and 5g (0.04 mole) melamine were added to the reaction mixture. The stirred mixture was maintained in the temperature range of 120°–130°C for a period of five hours. Heating was stopped and an additional 15g (0.12 mole) melamine was added in portions to the reaction mixture which was stored overnight at room temperature.

The reaction mixture was heated to 130°C and the final 20g (0.16 mole) melamine was added in portions over a period of one hour. During this addition the temperature was increased to about 155°C and the reaction mass was maintained at about 160°C for two hours. The temperature of the reaction mixture was increased to 240°C over a one hour period and finally maintained at 240°–265°C for 1.5 hours. During the final heating period, the reaction mixture became a tan-creamy mass and foamed. On cooling to room temperature, the reaction mixture solidified. This product was pulverized to give a powder which weighed 106g and melted at 264°–273°C with decomposition. It is to be noted that the molar ratio of dipentaerythritol:phosphoric acid:phosphorus pentoxide:melamine in this example was 1:1:2.4:3.2.

Twenty gram samples of the additive prepared above were slurried in 50 ml distilled water and treated with 5% aqueous NaOH as summarized below. The water was removed in vacuo, the residue dried at 140°C, and then thermally degassed at 242°C for two hours.

Table VII

Thermal Behavior of Phosphate Flame Retardants Isolated from Aqueous Slurries of Varying pH

| Sample No. | ml 5% NaOH Added | Approximate ph Before | Approximate ph After | Wt. Loss (g) on Heating | Observations on Heating Phosphate Flame Retardants |
|---|---|---|---|---|---|
| 1 | 20 | 2 | 4 | 2.3 | foamed some, darkened slightly |
| 2 | 30 | 2 | 5 | 2.6 | foamed some, darkened slightly |
| 3 | 40 | 2 | 6 | 3.0 | no foaming, darkened slightly to brown |
| 4 | 50 | 2 | 7 | 1.9 | no foaming, darkened slightly to tan-brown |
| 5 | 0 | Not Treated | Not Treated | 1.4 | foamed, dark on top |

On the basis of the above data, it was concluded that pH adjustment of a water slurry of additive to the approximate range of 4–7 should give a phosphate flame retardant additive capable of imparting the best color and thermal stability to polypropylene.

Samples of the above NaOH treated additives were evaluated in polypropylene. The phosphate additives were blended in polypropylene on a 3-inch roll mill at 320°–350°F for five minutes. Specimens (5 inch × ½inch × ⅛inch) for use in the flame retardant test were cut from sheets of the formulation that had been molded at 400°–450°F. Results of these tests are shown in Table VIII.

Table VIII

Evaluation of Flame Retardant Polypropylene Samples (45 phr)[a] Containing Phosphate Flame Retardants Isolated from Aqueous Slurries of Varying pH (Embodiment IV)

| Sample No. | Approximate pH of Additive/Water Slurry | ASTM D2863-70 Oxygen Index | ASTM D635-63[b] | Observations[c] |
|---|---|---|---|---|
| 1 | 4 | 29.1 | NB | Nondripping, excellent char, foamed just a little at 480°F/10 min. |
| 2 | 5 | 29.5 | NB | Same as 1 |
| 3 | 6 | 26.9 | SE | Nondripping, good char, no foam at 480°F/10 min. |
| 4 | 7 | 20.6 | B | Fairly good char but burning hunks fell off in ASTM D635-63 test, no foam at 480°F/10 min. |
| 5 | 2 | 28.4 | NB | Nondripping, excellent char, |

Table VIII-continued
Evaluation of Flame Retardant Polypropylene Samples (45 phr)[a]
Containing Phosphate Flame Retardants Isolated from
Aqueous Slurries of Varying pH (Embodiment IV)

| Sample No. | Approximate pH of Additive/ Water Slurry | ASTM D2863-70 Oxygen Index | ASTM D635-63[b] | Observations[c] |
|---|---|---|---|---|
| (Control) | | | | foams at 480°F/10 min. |

[a]phr represents parts of additive per 100 parts of polymer; additive level in all samples was 45 phr.
[b]Notations B, NB and SE represent, respectively, burning, nonburning and self-extinguishing.
[c]The samples were broken and visually examined in cross-section for voids (foaming).

The results in Table VIII indicate that sample 3 (aqueous slurry adjusted to a pH of about 6) did not foam at 480°F/10 min. It is to be noted that sample 4 (aqueous slurry adjusted to a pH of about 7) did not foam at 480°F/10 min. but burned. Samples 5 (no base treatment), 1 (base treated to pH 4), and 2 (base treated to pH 5) foamed at 480°F/10 min. A pH range of 4–6 is now considered suitable to obtain the best balance of properties in regard to color, flame-retardancy and acidity necessary for charring.

I claim:

1. A flame retarded, nonburning, nondripping, char-forming composition of polypropylene containing a flame retarding amount of a mixture of ammonium polyphosphate and dipentaerythritol where every 100 parts of polypropylene contain about 10 to 70 parts ammonium polyphosphate and about 5 to 30 parts dipentaerythritol with the total amount of the two additives being between about 30 and 90 parts.

2. The composition of claim 1 wherein the ammonium polyphosphate has been coated with about 1 to 3 weight percent stearyl amine.

3. The composition of claim 1 wherein every 100 parts of polypropylene contain 1 to 10 parts of fillers selected from a group consisting of glass fiber, titanium dioxide, or asbestos.

4. The composition of claim 1 wherein every 100 parts of polypropylene contain about 20 to 40 parts ammonium polyphosphate and about 10 to 20 parts dipentaerythritol with the total amount of the two additives being between about 40 and 60 parts.

5. The composition of claim 4 wherein the ammonium polyphosphate has been coated with about 1 to 3 weight percent stearyl amine.

6. The composition of claim 4 wherein the ammonium polyphosphate and dipentaerythritol are employed in a weight ratio of between 6:1 and 1:1.

7. A composition of claim 6 wherein the ammonium polyphosphate has been coated with about 1 to 3 weight percent stearyl amine.

8. The composition of claim 6 wherein every 100 parts of polypropylene contains about 1 to 10 parts of filler selected from a group consisting of glass fiber, titanium dioxide, or asbestos.

9. The composition of claim 1 wherein the combination of additives are thermally degassed prior to being used to formulate the polypropylene composition.

10. A flame retarded, nonburning, nondripping, char-forming composition of polypropylene containing a flame retarding amount of a composition resulting from the degassing of a mixture of ammonium polyphosphate and dipentaerythritol.

* * * * *